US010473514B1

(12) United States Patent
Ostermann

(10) Patent No.: US 10,473,514 B1
(45) Date of Patent: Nov. 12, 2019

(54) LIVESTOCK WEIGHING DEVICE

(71) Applicant: Jerry L. Ostermann, Sylvan Grove, KS (US)

(72) Inventor: Jerry L. Ostermann, Sylvan Grove, KS (US)

( * ) Notice: Subject to any disclaimer, the term of this patent is extended or adjusted under 35 U.S.C. 154(b) by 53 days.

(21) Appl. No.: 15/435,023

(22) Filed: Feb. 16, 2017

Related U.S. Application Data

(60) Provisional application No. 62/295,639, filed on Feb. 16, 2016.

(51) Int. Cl.
| | | |
|---|---|---|
| *G01G 17/08* | (2006.01) | |
| *G01G 23/40* | (2006.01) | |
| *G01G 21/26* | (2006.01) | |
| *A01K 11/00* | (2006.01) | |
| *A01K 1/00* | (2006.01) | |
| *B05C 5/02* | (2006.01) | |

(52) U.S. Cl.
CPC ............ *G01G 17/08* (2013.01); *A01K 1/0023* (2013.01); *A01K 11/00* (2013.01); *G01G 21/26* (2013.01); *G01G 23/40* (2013.01); *B05C 5/0237* (2013.01)

(58) Field of Classification Search
CPC ........ G01G 17/08; G01G 21/18; G01G 21/26; G01G 23/40; A01K 1/0023; A01K 11/00; A01K 11/005
See application file for complete search history.

(56) References Cited

U.S. PATENT DOCUMENTS

| | | | |
|---|---|---|---|
| 4,138,968 A | 2/1979 | Ostermann | |
| 4,280,448 A | 7/1981 | Ostermann | |
| 4,286,679 A * | 9/1981 | Schneider | G01G 17/08 |
| | | | 177/132 |
| 4,533,008 A | 8/1985 | Ostermann | |
| 4,569,408 A * | 2/1986 | Berns | G01G 21/08 |
| | | | 177/132 |
| 4,850,441 A * | 7/1989 | Mosdal | G01G 17/08 |
| | | | 177/136 |
| 5,734,128 A * | 3/1998 | Gades | G01G 17/08 |
| | | | 177/132 |
| 6,239,711 B1 * | 5/2001 | Downey | A01K 1/0023 |
| | | | 340/528 |
| 6,521,847 B1 | 2/2003 | Ostermann | |
| 6,838,625 B2 | 1/2005 | Ostermann | |
| 7,598,463 B2 * | 10/2009 | Kleinsasser | G01G 17/08 |
| | | | 119/842 |
| 8,584,619 B2 * | 11/2013 | Eakin | A01K 29/00 |
| | | | 119/511 |
| 10,132,673 B1 * | 11/2018 | Eakin | G01G 17/08 |
| 2003/0192487 A1 * | 10/2003 | Zimmerman | A01K 1/0023 |
| | | | 119/842 |

(Continued)

*Primary Examiner* — Natalie Huls
(74) *Attorney, Agent, or Firm* — Erickson Kernell IP, LLC; Kent R. Erickson

(57) ABSTRACT

A livestock weighing device that performs a secondary operation such as marking animals having a desired minimum weight with a visual indicia to aid sorting thereof. The weight of an animal moving across the platform actuates a cable system to move a shuttle associated with an actuator. The actuator changes condition to initiate a secondary operation, such as opening an outlet valve for a container of paint to dispense a quantity of paint onto the animal supported on the platform, when the sled is moved in a predetermined direction and the animal weighs more than the minimum required weight.

16 Claims, 14 Drawing Sheets

(56) References Cited

U.S. PATENT DOCUMENTS

| | | | | |
|---|---|---|---|---|
| 2005/0161006 A1* | 7/2005 | Reimer | ............... | A01K 1/0023 |
| | | | | 119/842 |
| 2008/0202444 A1* | 8/2008 | Stenzel | ............... | A01K 1/0209 |
| | | | | 119/480 |
| 2014/0190422 A1* | 7/2014 | Nelson | ................... | G01G 17/08 |
| | | | | 119/753 |
| 2017/0219415 A1* | 8/2017 | Driver | ................... | A01K 29/00 |

* cited by examiner

LIVESTOCK WEIGHING DEVICE

CROSS-REFERENCE TO RELATED APPLICATIONS

This application claims the benefit of U.S. Provisional Patent Application No. 62/295,639, filed Feb. 16, 2016, the disclosure of which is hereby incorporated herein in its entirety by reference.

BACKGROUND

The sorting or marking of livestock by weight to determine which animals of a group and variety are sufficiently developed to be marketed is a common practice. Those animals having a weight above a pre-calculated amount based upon the type of animal and present market conditions in representing the best financial return thereon are selected by the producer for sale. Certain types of livestock, such as pigs, hogs, and the like, have an unpleasant disposition and oftentimes exhibit hostile tendencies toward their caretaker. The sorting of these types of animals can be very dangerous and is quite a time consuming task. Further, the sorting process often excites the animals which can result in weight loss and/or physical injury to the animals. Devices for sorting livestock, such as those disclosed in U.S. Pat. Nos. 262,373, 2,715,387, and 4,006,717 are generally not automated and/or require an outside source of power to operate the device. Clearly, the use of external power supplies to operate a sorter for livestock is neither convenient, economical, nor safe for use in most applications. Further, such devices tend to arouse the animals, thereby causing weight loss and other physical injuries which reduce the economic value of the animal.

SUMMARY

A high-level overview of various aspects of the invention is provided here to introduce a selection of concepts that are further described in the Detailed-Description section below. This summary is not intended to identify key features or essential features of the subject matter, nor is it intended to be used in isolation to determine the scope of the subject matter. In brief, this disclosure describes, among other things, a livestock weighing device that identifies animals that exceed a predetermined weight and marks the animals with an identifying indicia so that they may be sorted or which actuates other secondary operations besides marking animals. Such secondary operations may include releasing a latch or lock on a gate to control which of a selected set of pens the animal moves into.

The livestock weighing device comprises a frame, a platform and first and second scale arms extending approximately horizontally when the weighing device is positioned on a horizontal surface. The platform may be formed as a bottom panel of a chute through which the animal must pass to travel between different pens containing food or water to encourage the animals to pass through the chute. The first scale arm is pivotally connected to the frame at a first pivotal connection proximate a first end of the platform and the first scale arm is connected to a first suspension link proximate a second end of the platform. The second scale arm is pivotally connected to the frame at a second pivotal connection proximate a second end of the platform and the second scale arm is connected to a second suspension link proximate a first end of the platform. The platform is suspended from the first scale arm by a first hanger connected to the first scale arm between the first pivotal connection and the first suspension link and the platform is suspended from the second scale arm by a second hanger connected to the second scale arm between the second pivotal connection and the second suspension link.

A track is connected to and extends generally horizontally relative to the frame above the first and second scale arms. The track extends generally longitudinally relative to the intended direction of travel of an animal across the platform. A shuttle is supported on and is longitudinally shiftable across the track. A first flexible linkage is operably connected between the shuttle and the first suspension link, wherein the first suspension link may comprise a portion of the first flexible linkage. A second flexible linkage is operably connected between the shuttle and the second suspension link, wherein the second suspension link may comprise a portion of the second flexible linkage.

A first guide assembly is connected to the device proximate a second end of the platform and redirects the first flexible linkage to extend horizontally and inward relative to the second end of the platform and toward the shuttle. A second guide assembly is connected to the device proximate a first end of the platform. The second guide means redirects the second flexible linkage to extend horizontally and inward relative to the first end of the platform and toward the shuttle. An actuator operably is advanceable between first and second conditions through longitudinal movement of the shuttle.

The device further includes a trip weight setting means which applies a resistive force to prevent advancement of the actuator between the first and second conditions until a counteracting force corresponding to the weight of the animal supported on the platform is transmitted as a counteracting force through the first and second scale arms and the first and second flexible linkages and exceeds the resistive force. When the counteracting force exceeds the resistive force the actuator advances between the first and second conditions to perform a secondary operation.

The secondary operation may be marking an animal on the platform. The marking substance is contained in a container supported on the weighing device. An applicator tube having a check valve at one end and a pressure responsive tube closing valve at an opposite end. Advancement of the actuator from the first to the second condition causes the tube closing valve to open to dispense a quantity of the marking substance or paint.

In one embodiment, the livestock weighing device includes a livestock chute and a scale with an integrated marking mechanism. The chute is positionable between adjacent livestock pens to force the animals to pass through the chute to move between the pens at which time they are weighed and, if sufficiently heavy, are marked. The scale includes a counterbalance that is useable to select a minimum weight required of an animal for the animal to be marked. The counterbalance is configured with a large mechanical advantage such that only a fraction of the desired animal weight need be provided on the counterbalance.

The scale also includes a pair of oppositely oriented support arms that are pivotably coupled to a scale housing at a first end and to a cable system at a second end. A hanger arm is coupled between each of the support arms and the chute to transfer the weight of the animal to the respective support arm. The cable system couples the support arms with the counterbalance to effectuate the transfer of forces therebetween for balancing the weight of the animal relative to the counterbalance. The cable system also couples to the integrated marking system which includes a sled or shuttle with a can of spray paint and a trigger apparatus. The weight of the animal causes the support arms to pivot and thereby move the cable of the cable system which moves the sled of the marking system back-and-forth along the longitudinal axis of the chute.

When the animal has at least the minimum predetermined weight, the sled is moved to actuate the trigger apparatus which in turn depresses a nozzle on the spray paint container to dispense an amount of spray paint onto the animal's back. When the animal is underweight the trigger apparatus is not actuated and thus the animal is not marked. The marking system can be configured to only mark animals as they pass through the chute in a single direction and to only mark the animals in a particular region of their back.

DESCRIPTION OF THE DRAWINGS

Illustrative embodiments of the invention are described in detail below with reference to the attached drawing figures, and wherein.

DETAILED DESCRIPTION

Figure 1:
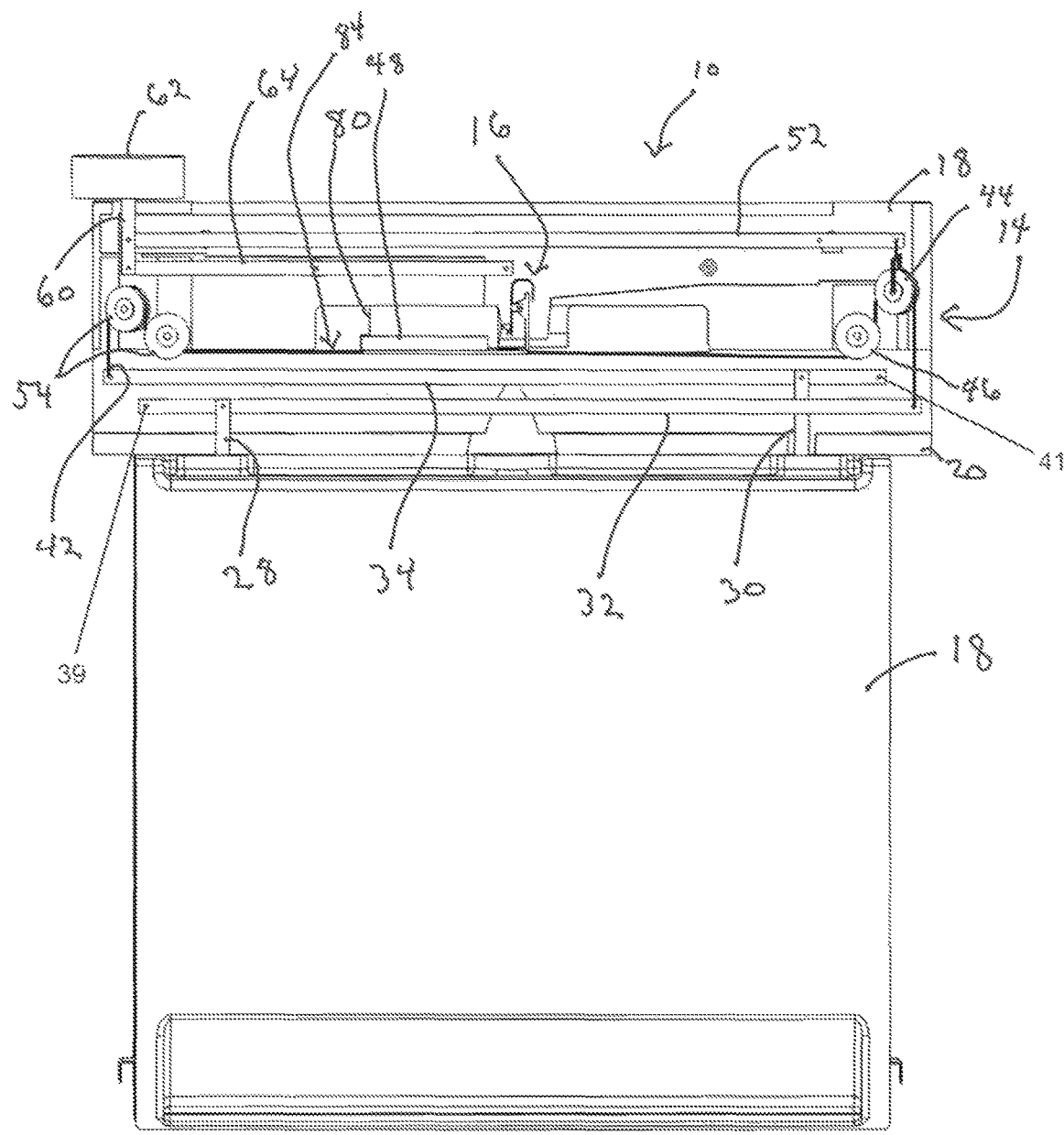
FIG. 1 is an elevational side view of a livestock weighing and marking device with a cover plate removed from top portion thereof to reveal internal components depicted in accordance with an embodiment of the invention.
Figure 2:
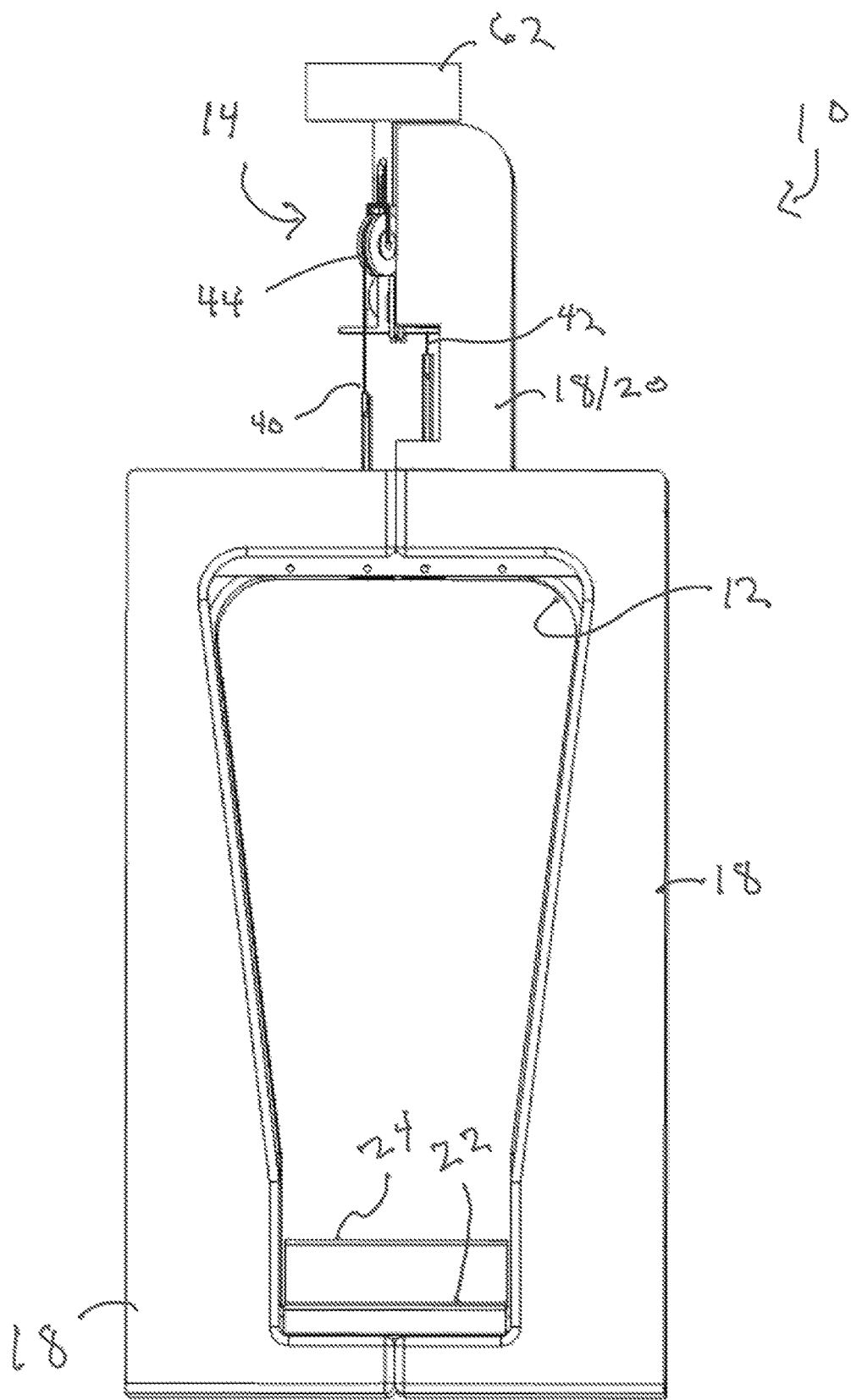
FIG. 2 is an end view of the device of FIG. 1.

The subject matter of select embodiments of the invention is described with specificity herein to meet statutory requirements. But the description itself is not intended to necessarily limit the scope of embodiments. Rather, the subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations in the form of changes that are insignificant to the function.

With reference now to FIGS. 1-11, a livestock weighing and sorting device 10 is described in accordance with an embodiment of the invention. The device 10 can be configured for operation with any livestock animals including pigs, hogs, cattle, bison, or the like. The device 10 comprises livestock chute 12 and a scale 14 with an integrated marking mechanism 16. The device 10 includes exterior panels 18 and a frame 20 configured to enclose and support the chute 12, scale 14, and marking mechanism 16. Throughout the drawings, one or more of the exterior panels 18 and/or the frame 20 are not shown so as to not obstruct the view of other components. As used herein, the terms horizontal and vertical and the like are used with reference to the weighing and sorting device supported on level ground.

The livestock chute 12 is disposed within a lower portion of the device 10 and is sized to enable a single animal to pass through at a time. A bottom panel 22 of the chute 12 preferably includes a raised ridge 24 that is generally centrally located along the longitudinal length of the chute 12. Bottom panel 22 may also be referred to as platform 22. The ridge 24 is configured to prevent or deter an animal from lying down within the chute 12. The height of the ridge 24 and the spacing between each of the first and second ends of the platform 22 and the ridge 24 is selected to urge an animal of a selected species to be weighed on the scale to place both front feet and at least one rear foot on the first side of ridge 24 before placing a front foot over and on the opposite side of ridge 24 to ensure proper functioning of the scale. Ridge 24 preferably extends across the platform 22 from one side of the chute 12 to the other and centrally between the entrance and the exit to the chute 12 or platform 22. In the embodiment shown, the cross-section of the ridge 24 taken along a longitudinal axis through the platform 22 and chute 12 is triangular.

A top wall 25 of the chute 12 includes a generally centrally located aperture or marking window 27 through which a marking indicia may be sprayed as described more fully below. In another embodiment, the marking window 27 may be located in another position to enable marking a different portion of the animal.

Figure 3:
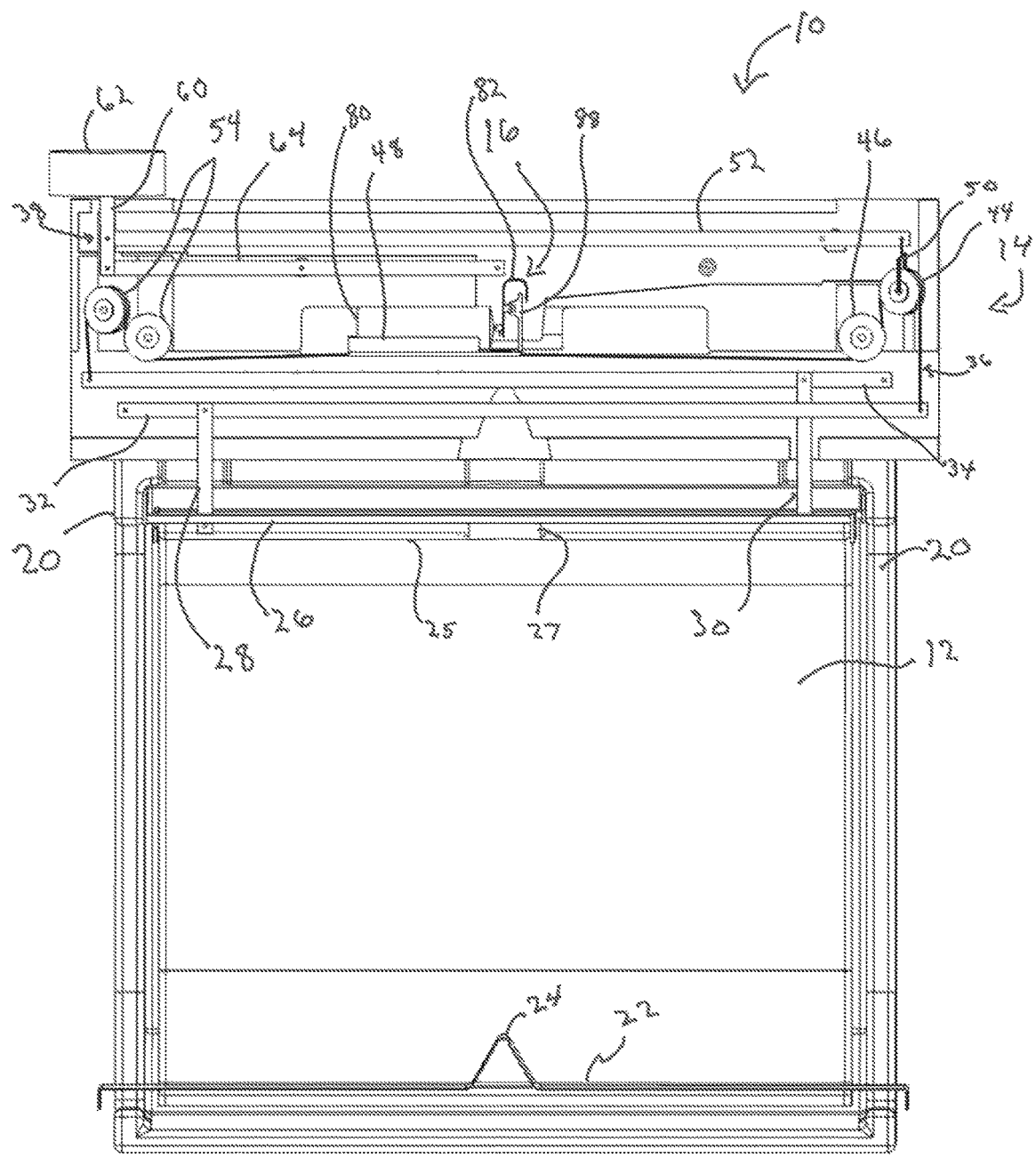
FIG. 3 is an elevational side view of the device of FIG. 1 depicted with a lower enclosure panel and a side portion of a weighing chute removed.

Stabilizing torsion rods 26 may be provided to reduce longitudinal and lateral movements of the chute 12 as the animal enters/exits, as depicted in FIG. 3. In one embodiment, two oppositely oriented sets of two torsion rods 26 each are provided. The torsion rods 26 extend longitudinally along the length of the chute 12 and couple to the frame 20 at one of their ends and to the chute 12 at their other ends. The rods 26 thus resist movement of the chute 12 in either direction along the longitudinal dimension thereof. The rods 26 also deflect to allow the chute 12 to move vertically upward or downward as the animal's weight is applied.

Figure 4:
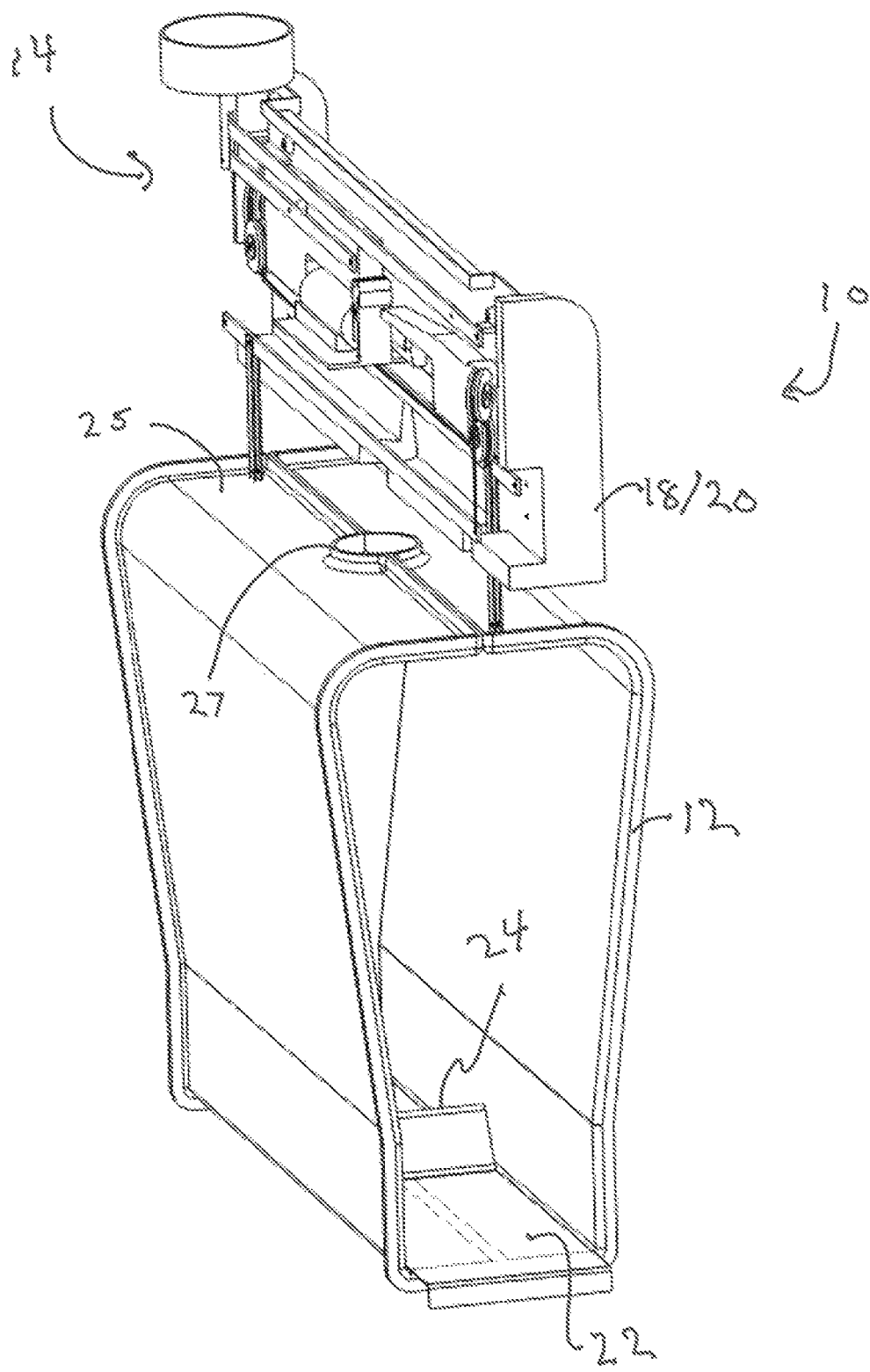
FIG. 4 is a perspective end view of the device of FIG. 1 depicted with a lower enclosure removed.
Figure 5:
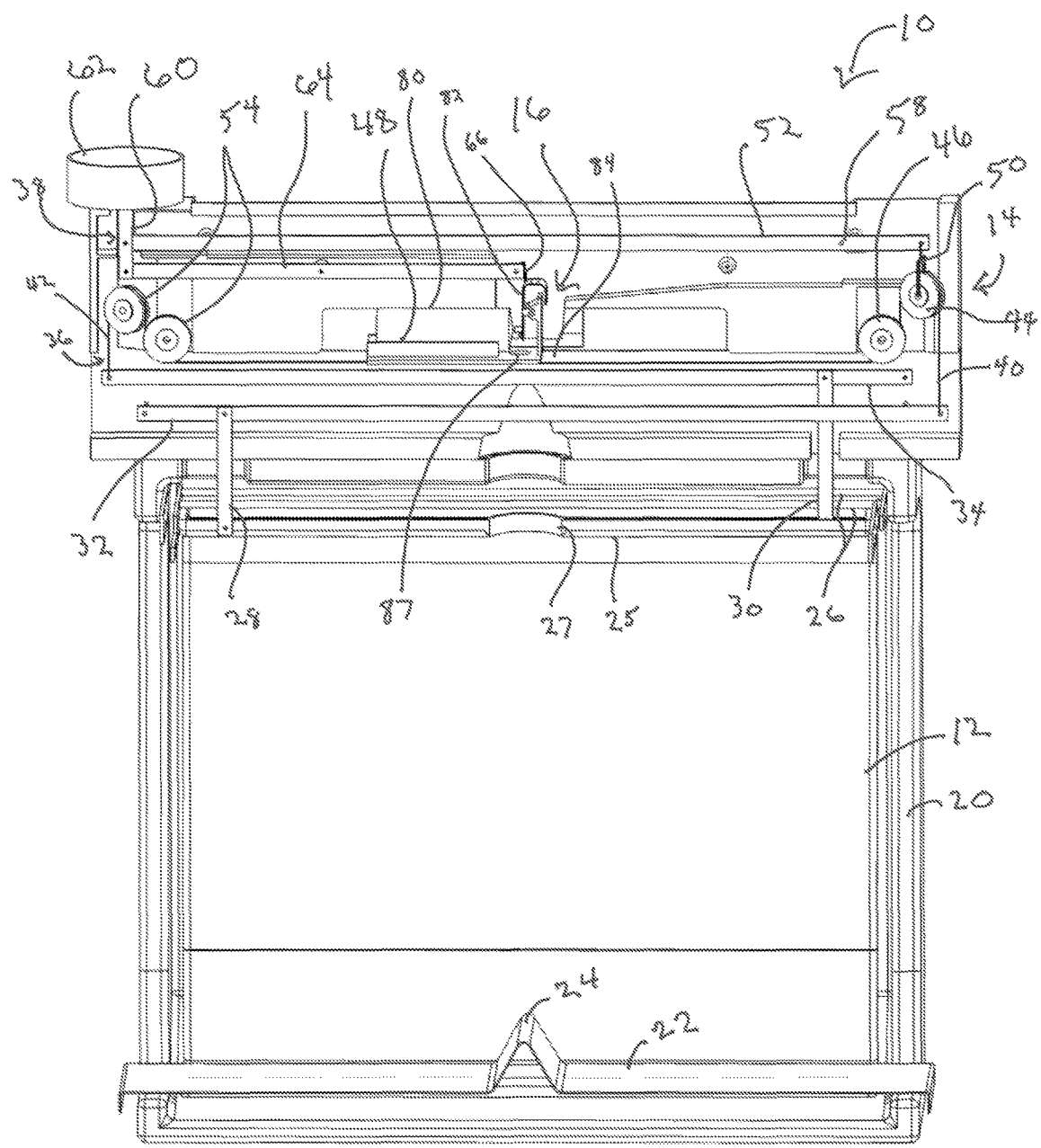
FIG. 5 is a perspective side view of the device depicted with a lower enclosure panel and a side portion of a weight chute removed.
Figure 6:
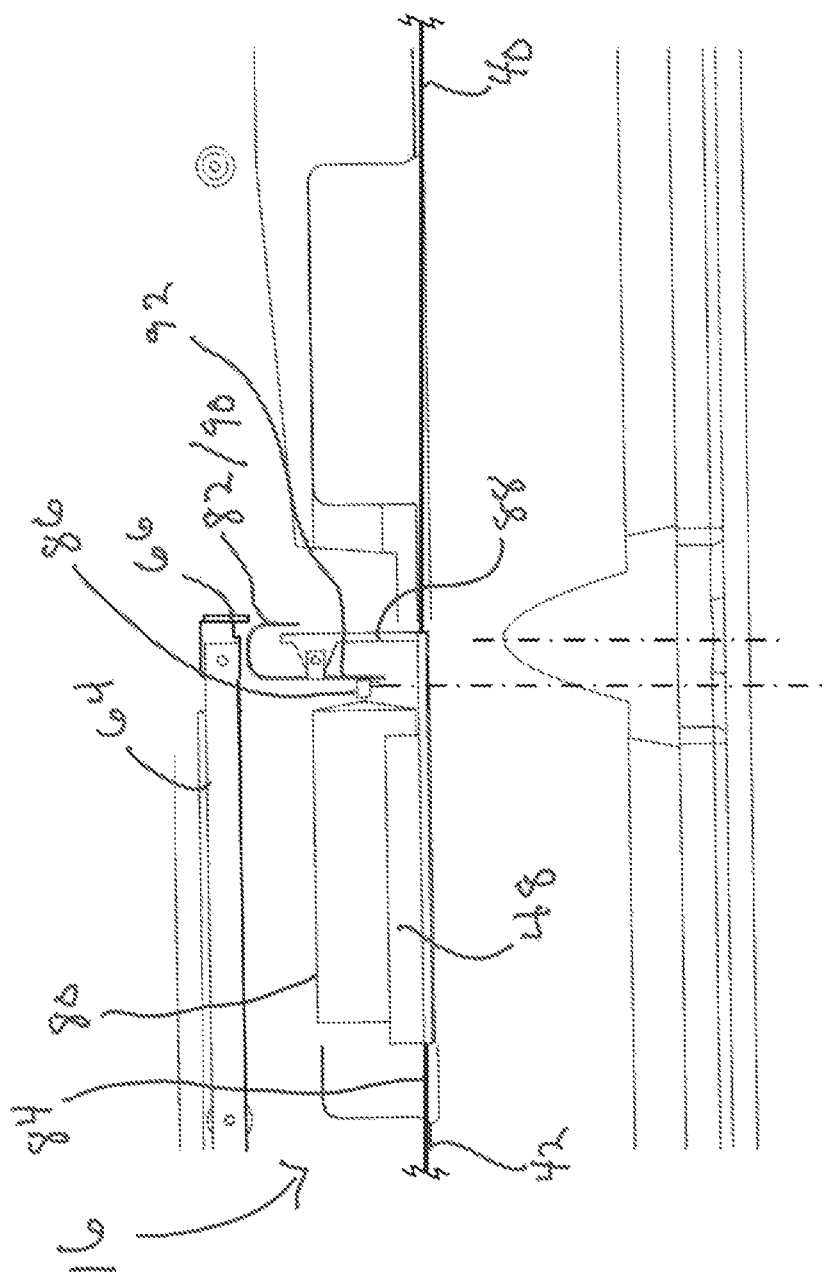
FIG. 6 is an enlarged partial side view of a marking mechanism of the device of FIG. 1 depicted in a neutral position in accordance with an embodiment of the invention.

The chute 12 is coupled to the scale 14 by a first and second hangers or hanger arms 28, 30. The first hanger arm 28 is coupled to the chute 12 near an entrance to the chute 12 and on a first side of a longitudinal centerline of the chute 12, as depicted in FIG. 4. The second hanger arm 30 is oppositely disposed near an exit of the chute 12 and on a second side of the longitudinal centerline. The chute 12 is described herein relative to an entrance and an exit with the entrance lying on the left-hand side of the drawing of the chute 12 as depicted in FIGS. 1 and 3-9. Such is not intended to limit the direction of travel of animals through the chute 12, nor operation of the chute 12 relative to a particular direction of travel.

The scale 14 includes first and second scale arms or support arms 32, 34, which extend generally horizontally and are pivotably coupled to the first and second hanger arms 28, 30, respectively, along with a cable system 36 that operatively couples the support arms 32, 34 with a counterbalance mechanism 38 and with the integrated marking mechanism 16. One end of the first support arm 32 is pivotably coupled to the frame 20 at pivot point 39 near the entrance of the chute 12 and the other end of the first support arm 32 is coupled to a first flexible linkage or cable 40 of the cable system 36 near the exit of the chute 12. The coupling between the first support arm 32 and the first hanger arm 28 is adjacent the coupling of the first support arm 32 with the frame 20 to thus create a long lever arm and large mechanical advantage in the first support arm 32 by the length thereof between the hanger arm 28 and the coupling of the first support arm 32 with the first cable 40.

The second support arm 34 is oppositely oriented; the second support arm 34 is coupled at one end thereof to the frame 20 at a pivot point 41 near the exit of the chute 12 and to a second flexible linkage or cable 42 near the entrance of the chute 12. The second hanger arm 30 couples to the second support arm 34 adjacent the coupling of the second hanger arm 30 with the frame 20. A long lever arm and large mechanical advantage is thus formed in the second support arm 34 by the length of the second support arm 34 between the second hanger arm 30 and the coupling with the second cable 42.

Stops 100 (depicted in FIG. 10) may be provided on the frame 20 or exterior panels 18 which obstruct pivotal movement of the first and second support arms 32, 34 beyond a predetermined downward distance. The stops 100 may support the support arms 32, 34, for example, when the animal first enters or leaves the chute 12 and applies a large force near the respective end of the chute 12.

Figure 10:
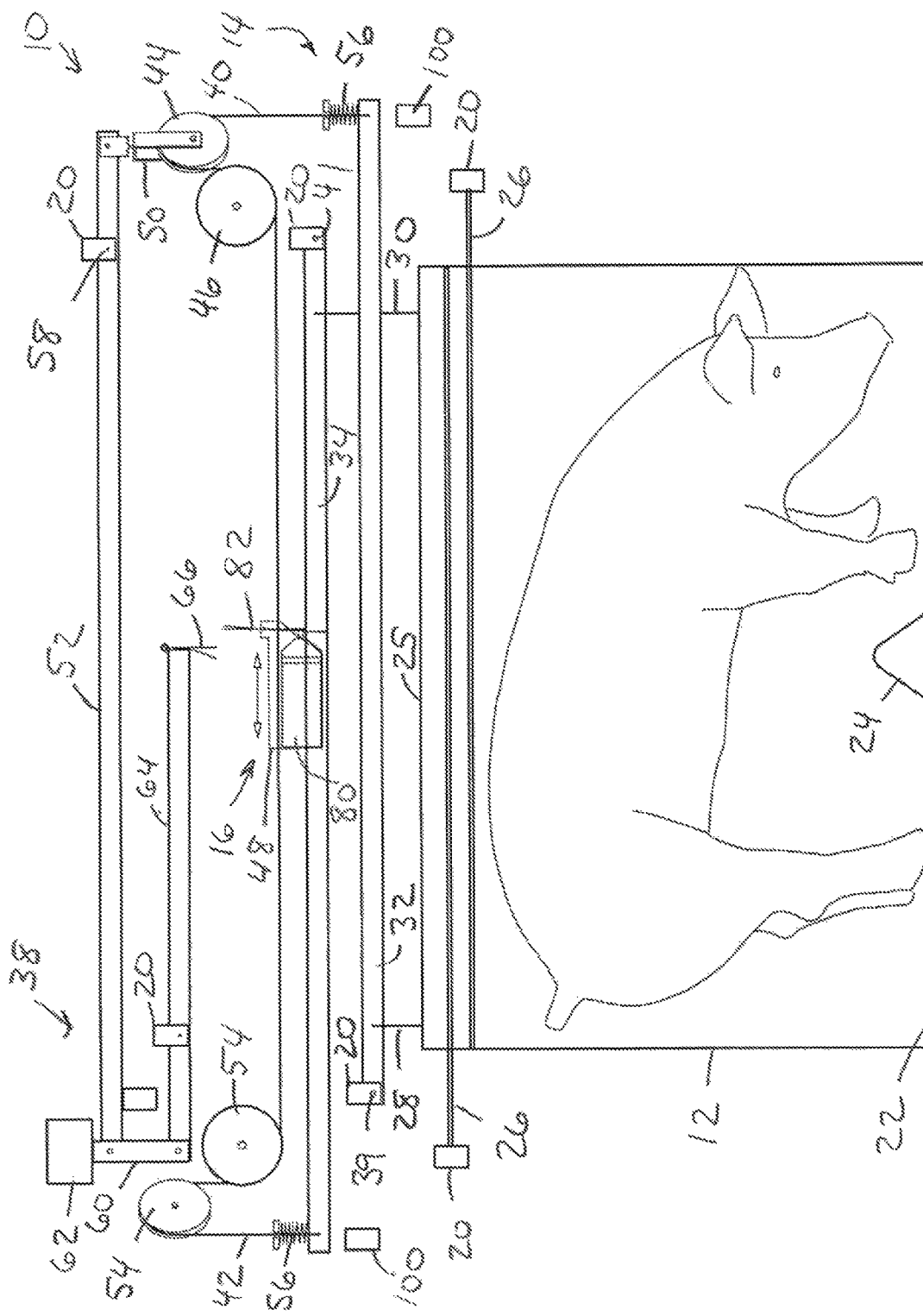
FIG. 10 is a schematic illustration of a livestock weighing and sorting device depicted in accordance with an embodiment of the invention.

The first cable 40 extends from the end of the first support arm 32 generally vertically upward over a floating pulley 44, around a first fixed pulley 46 and to a first end of a sled 48 of the integrated marking mechanism 16. The portion or length of the first cable 40 extending from the first support arm 32 to the floating pulley 44 may be referred to as a first suspension link. The floating pulley 44 is supported on a yoke 50 that is coupled to a balance arm 52 of the counterbalance mechanism 38. The second cable 42 extends between the end of the second support arm 34 in a generally vertically upward direction to engage a pair of second fixed pulleys 54 before coupling to an opposite second end of the sled 48. The portion or length of the second cable 42 extending between the second support arm 34 and a first of the second fixed pulleys 54 may be referred to as a second suspension link. As depicted in FIG. 10, one or more springs 56 or similar resilient elements may be disposed between the first and second cables 40, 42 and the respective support arms 32, 34 and/or between the yoke 50 and the balance arm 52, among other configurations, to induce the scale 14 into a neutral balanced position to allow for balancing the scale 14 as well as to reduce the movement of the chute 12 when an animal enters.

In one embodiment, the first and second support arms 32, 34 and the balance arm 52 may be identically configured, but mounted differently in the device 10. As such, the complexity and variety of components of the device 10 is reduced and manufacturing is simplified.

The counterbalance mechanism 38 includes the balance arm 52 which is pivotably coupled to the frame 20 at a pivot point 58 located near its coupling with the yoke 50. An opposite end of the balance arm 52 is pivotably coupled to a generally vertical rod 60 which extends upward to a weight tray 62 and downward to a coupling with a trigger arm 64. The trigger arm 64 extends from the rod 60 toward the exit end of chute 12 and in a direction generally parallel to the balance arm 52 but a distance only about half that of the balance arm 52, e.g. to a generally central longitudinal position overlying the marking window 27 in the chute 12. As such, the balance arm 52, the rod 60, and the trigger arm 64 form a portion of a parallelogram linkage, e.g. the balance arm 52 and the trigger arm 64 remain generally parallel and the rod 60 remains generally vertical as the linkage is pivoted about its range of motion. As depicted in FIGS. 6-9 and 11, a trigger tab 66 may be provided on a distal end of the trigger arm 64 which cooperates with the marking mechanism 16 as described below.

The weight tray 62 may comprise a tray, bowl, or other container in which incremental counterweights may be placed to balance the scale 14 and/or designate a minimum weight that an animal must weigh before being marked. In another embodiment, the weight tray 62 is replaced with an electronic system configured to measure tension in the cable system 36 to determine the weight of the animal and/or the minimum weight requirement.

The marking mechanism 16 relies on the cable system 36 and the trigger arm 64 of the counterbalance mechanism 38 for operation. The marking mechanism 16 is configured to mark the animal near its center of gravity, however the marking mechanism 16 may be configured to mark the animal at another location, such as on its head or rump. The marking mechanism 16 comprises the sled or shuttle 48, a spray can 80, and a trigger lever or actuator 82. The sled 48 is disposed on a track 84 on the frame 20 and is slideably moveable by the first and second cables 40, 42 along the longitudinal axis of the chute 12. The track 84 may comprise a flat horizontal surface provided by the frame 20 that is bound along its lateral edges by the exterior panels 18, flanges extending from the frame 20, or other features. The track 84 may provide one or more rails, guides, or features that cooperate with mating features on the sled 48 to guide movement of the sled 48 in the longitudinal direction. The track 84 and/or the sled 48 might also include one or more bearings or bearing surfaces configured to aid sliding of the sled 48 along the track 84.

The sled 48 includes a contoured top surface configured to receive and support the spray can 80 in a horizontally oriented position. One or more features (not shown) such as tabs, clips, straps, or the like may be provided to secure the spray can 80 to the top surface of the sled 48. The spray can 80 preferably comprises a common spray paint can having a cylindrical body with a depressible nozzle 86 disposed at one end thereof from which a paint or other marking fluid may be dispensed. The spray can 80 is oriented on the sled 48 to direct the spray of the marking fluid vertically downward through an aperture 87 in the base of the sled 48 and through the marking window 27 in the chute onto the back of the animal positioned in the chute.

The fluid can comprise any available marking fluid useable to mark the animal with a visible indicia. For example, the fluid may comprise a paint, dye, or other colorant. The fluid may be visible under visible light or may only be visible when exposed to non-visible light, such as ultraviolet light, or when viewed with a lens, filter, or scanning device.

The sled 48 also includes an upstanding arm 88 on which the trigger lever 82 is pivotably mounted. The trigger lever 82 is pivotable about a horizontal axis extending perpendicularly to the longitudinal dimension of the sled 48 (and chute 12) and through the coupling of the trigger lever 82 and the arm 88. As depicted in FIGS. 6-9, the trigger lever 82 comprises a resilient or substantially rigid strip formed into an inverted J-shape. A hooked portion 90 of the J-shape extends upward and around a top end of the upstanding arm 88 while a leg 92 of the J-shape is directed downward into close proximity to the nozzle 86 of the spray can 80.

Figure 7:
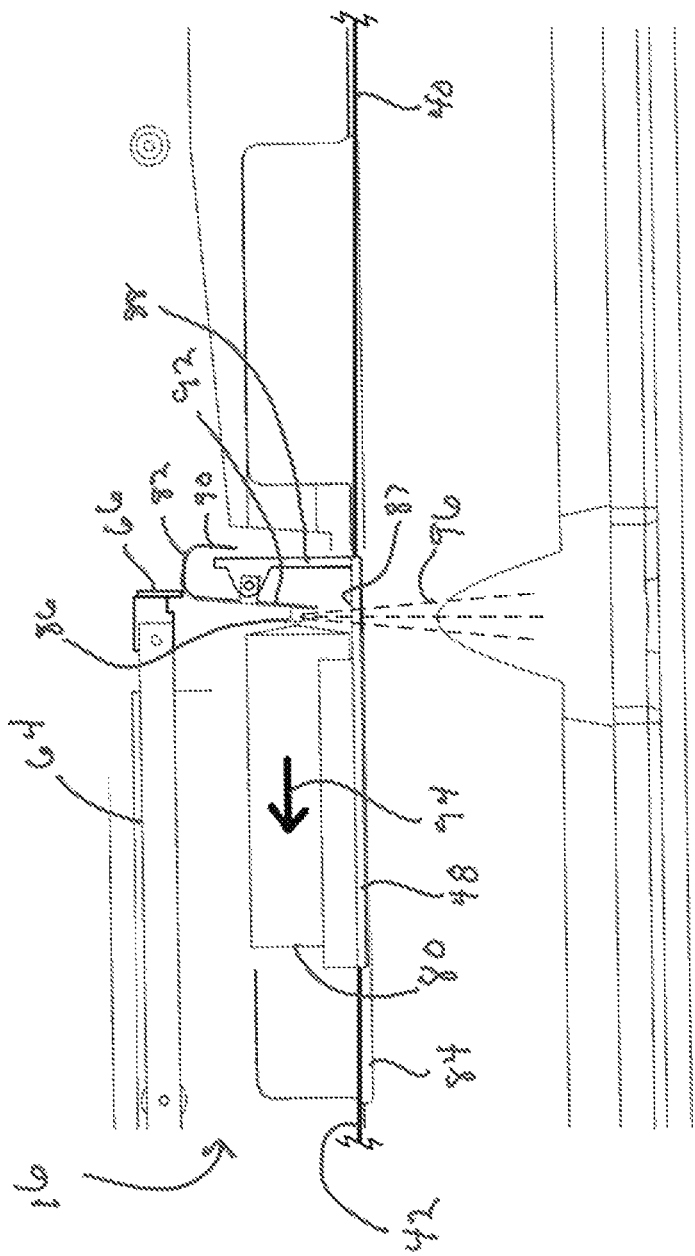
FIG. 7 is an enlarged partial side view of the marking mechanism of the device of FIG. 1 depicted in a marking position in accordance with an embodiment of the invention.
Figure 9:
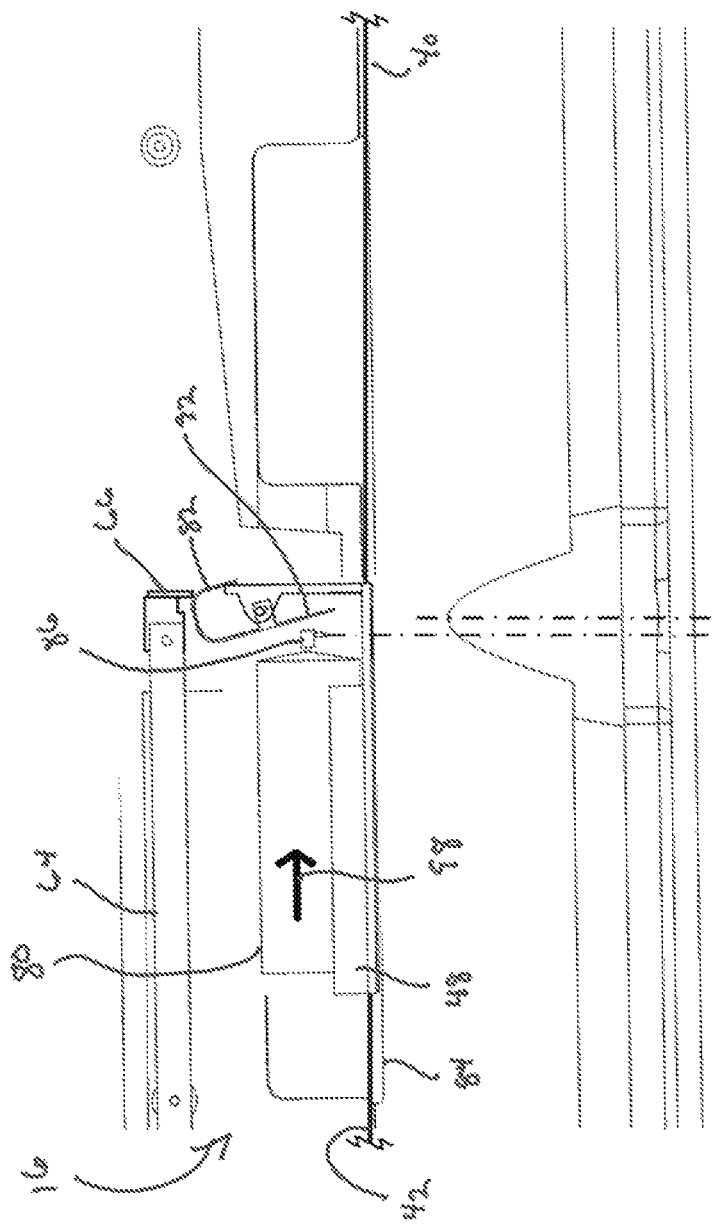
FIG. 9 is an enlarged partial side view of the marking mechanism of the device of FIG. 1 depicted in a non-marking direction position in accordance with an embodiment of the invention.

As depicted in FIGS. 7 and 9, the hooked portion 90 of the trigger lever 82 is vertically positioned to contact the trigger tab 66 on the trigger arm 64 as the sled 48 moves longitudinally when an animal of sufficient weight is positioned in the chute 12. Contact between the trigger lever 82 and the trigger tab 66 causes the trigger lever 82 to pivot about its coupling with the upstanding arm 88. When the sled 48 is moved in the direction indicated by arrow 94 shown in FIG. 7, e.g. toward the entrance end of the chute 12, the trigger lever 82 is pivoted clockwise relative to the view shown in FIG. 7 and depresses the nozzle 86 to dispense a marking fluid 96. When the sled 48 is moved in the opposite direction indicated by the arrow 98 in FIG. 9, the trigger lever 82 is pivoted in the counterclockwise direction away from the nozzle 86.

In this manner, the marking mechanism 16 will only mark animals as they travel through the chute 12 in a predetermined direction. Entry of the animal into the chute 12 from either direction first at least partially depresses or tilts the chute 12 downward on that respective end which, in turn, draws the sled 48 in one direction and to one side of the trigger tab 66. As the animal moves fully into the chute 12, the animals weight shifts toward equilibrium across the length of the chute 12 and then toward the opposite end of the chute 12. The sled 48 is thus moved longitudinally and into contact with the trigger tab 66 (assuming the animal weighs more than the minimum) by the shifting weight causing the cables 40, 42 to be pulled by the shifting chute 12. The direction of the movements of the sled 48 is thus determined by the end the animal first applies weight to and the direction of movement of the animal's weight along the length of the chute 12.

The weight of the animal moving from one end of the chute 12 to the opposite end may result in the sled 48 being jerked or abruptly moved back-and-forth. This shaking action may aid to shake or agitate the marking fluid in the spray can 80 to keep the fluid well stirred and/or particulates therein well dispersed.

Figure 8:
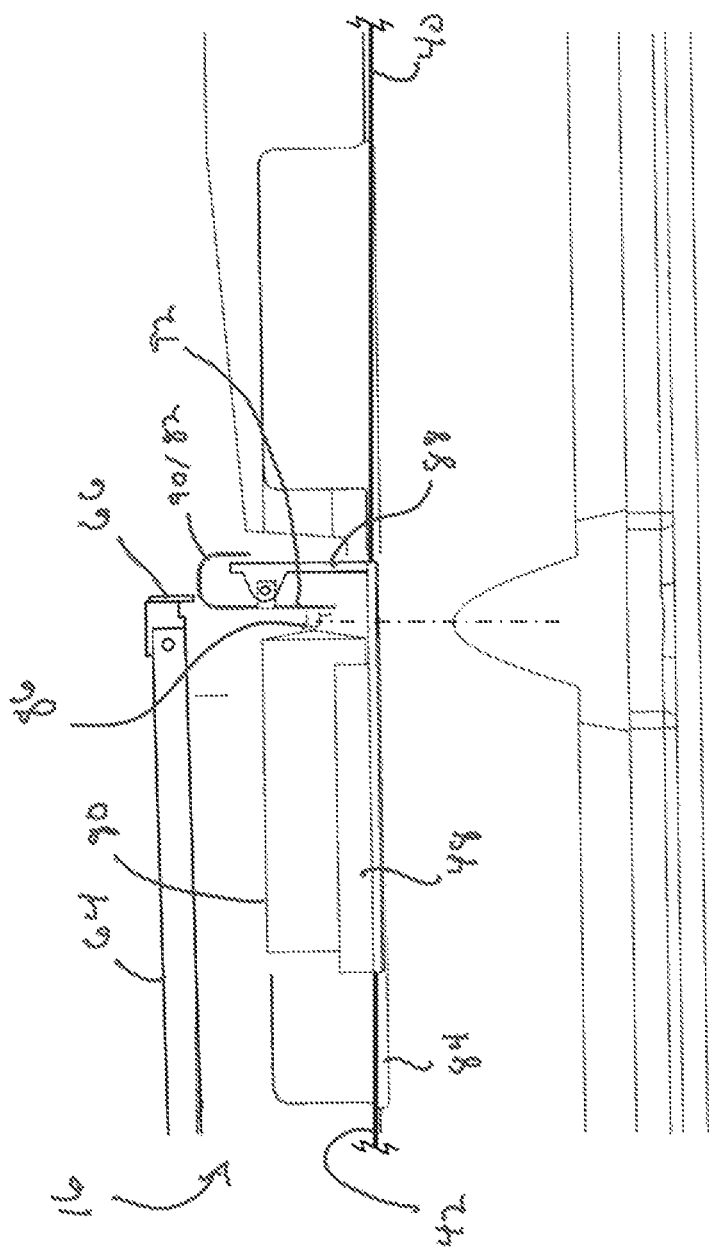
FIG. 8 is an enlarged partial side view of the marking mechanism of the device of FIG. 1 depicted in an underweight position in accordance with an embodiment of the invention.

As depicted in FIG. 8, when an animal weighs less than the set minimum required weight, the trigger tab 66 is not lowered downward into the path of the trigger lever 82 and thus does not sufficiently contact the trigger lever 82 to cause marking.

With continued reference now to FIGS. 1-9, operation of the livestock weighing and sorting device 10 is described in accordance with an embodiment of the invention. The device 10 is preferably placed in a fence line between two holding pens. Necessities, such as food or water may be placed in opposite pens to lure the animals to travel between the pens and thus through the device 10. A minimum required weight is selected. Selected incremental weights corresponding to the required weight are positioned in the weight tray 62 so as to apply the weight of the selected incremental weights to the counterbalance mechanism 38.

An animal enters the chute 12 from the entrance end thereof causing the sled 48 to be moved to the right of the trigger tab 66 (positions are relative to the orientation of the device 10 as depicted in FIGS. 1, 3, and 5-9). As the animal moves toward the exit of the chute 12 the sled 48 is drawn left toward the trigger tab 66. At a position in which the animal's weight is substantially equally distributed along the length of the chute 12, the trigger lever 82 is brought into contact with the trigger tab 66, assuming the animal weighs at least the minimum required amount. The trigger lever 82 thus depresses the nozzle 86 and momentarily dispenses the marking fluid 97 onto the animal's back near the animal's center of gravity, as depicted in FIG. 7. As the sled 48 is continued to be drawn left the rounded hooked portion 90 of the trigger lever 82 may deflect the trigger arm 64 upward to allow the trigger lever 82 to pass below the trigger tab 66 and cease dispensing of the marking fluid. The now marked animal may continue through the chute 12 and into the second pen.

If the animal were underweight, the trigger arm 64 would not have been pivoted sufficiently to place the trigger tab 66 in the path of the trigger lever 82 and thus the animal would not have been marked. If the animal later decides to return to the first pen, the sled 48 will first be drawn to the left as the animal enters the chute 12. As the animal passes through the chute 12 to the left, the sled 48 will also move to the right. If the animal is of sufficient weight the trigger tab 66 will contact the trigger lever 82 but will pivot the leg 92 away from the nozzle 86 so as not to dispense the marking fluid, as depicted in FIG. 9. Or if the animal is not of sufficient weight, the trigger lever 82 will again pass beneath the trigger tab 66 and no marking fluid will be dispensed.

Using the device 10 a plurality of animals can be allowed to pass therethrough over a period of time on their own, to cause those of sufficient weight to be marked. The animals can then be easily sorted by visual inspection. In another embodiment, a sorting apparatus may be coupled to the device 10. The sorting apparatus may include a door that is actuated by the device 10 via, for example the cable system 36 to automatically sort the animals into separate pens based on their weight.

In further description of the operation of the device 10, when an animal enters the chute 12 through the entrance end and puts weight on the platform 22 proximate the entrance end or a first side of the platform 22, the weight of the animal pulls the entrance end of the platform 22 and chute 12 downward, pulling hanger arm 28 downward which pivots the second end of first scale arm 32 downward. Pulleys 44 and 46 function as guide means, redirecting the first cable 40 to change directions from extending vertically from the second end of the first scale arm 32 to horizontally as it extends inward toward the sled 48 to which it is connected. Downward pivoting of the second end of the first scale arm 32 draws the first cable 40 around the pulleys 44 and 46 and pulls the sled 48 horizontally towards the pulley 46.

As the animal moves through the chute 12 and places weight on the second end of the platform 22 on a side opposite the raised ridge 24 and proximate the exit end or a second side of the platform 22, the weight of the animal pulls the exit end of the platform 22 and chute 12 downward, pulling hanger arm 30 downward which pivots the second end of second scale arm 34 downward. Pulleys 54 function as guide means, redirecting the second cable 42 to change directions from extending vertically from the second end of the second scale arm 34 to horizontally as it extends inward toward the sled 48 to which it is connected. Downward pivoting of the second end of the second scale arm 34 draws the second cable 42 around the pulleys 54 and pulls the sled 48 horizontally towards the pulleys 54.

The counterbalance mechanism 38 functions as a trip weight setting means for applying a resistive force to prevent engagement and pivoting of the trigger lever or actuator 82 from a vertical orientation or first condition in which it does not act on nozzle 86 to a pivoted orientation or second condition in which it depresses nozzle 86 of spray can 80. When the a counteracting force corresponding to the weight of an animal supported on the platform 22, and transmitted to the balance arm 52 through the scale arms 32 and 32, cables 40 and 42 and floating pulley 44 does not exceed the resistive force exerted by the counterweight supported in weight tray 62, the ends of the balance arm 52 and trigger arm 64 opposite link or rod 60 pivot upward, which pivots trigger tab 66 out of the horizontal path of trigger lever 82, so that movement of the trigger lever 82 past the trigger tab 66 as the sled moves across track 84 does not result in pivoting of the trigger lever or actuator 82.

When the a counteracting force corresponding to the weight of an animal supported on the platform 22, and transmitted to the balance arm 52 through the scale arms 32 and 32, cables 40 and 42 and floating pulley 44 exceeds the resistive force exerted by the counterweight supported in weight tray 62, the ends of the balance arm 52 and trigger arm 64 opposite link or rod 60 pivot downward, which pivots trigger tab 66 into the horizontal path of trigger lever 82, so that movement of the trigger lever 82 past the trigger tab 66 as the sled moves toward the entrance end of the chute 12 pivots the trigger lever or actuator 82 to engage and depress nozzle 86 on spray can 80.

Figure 11:
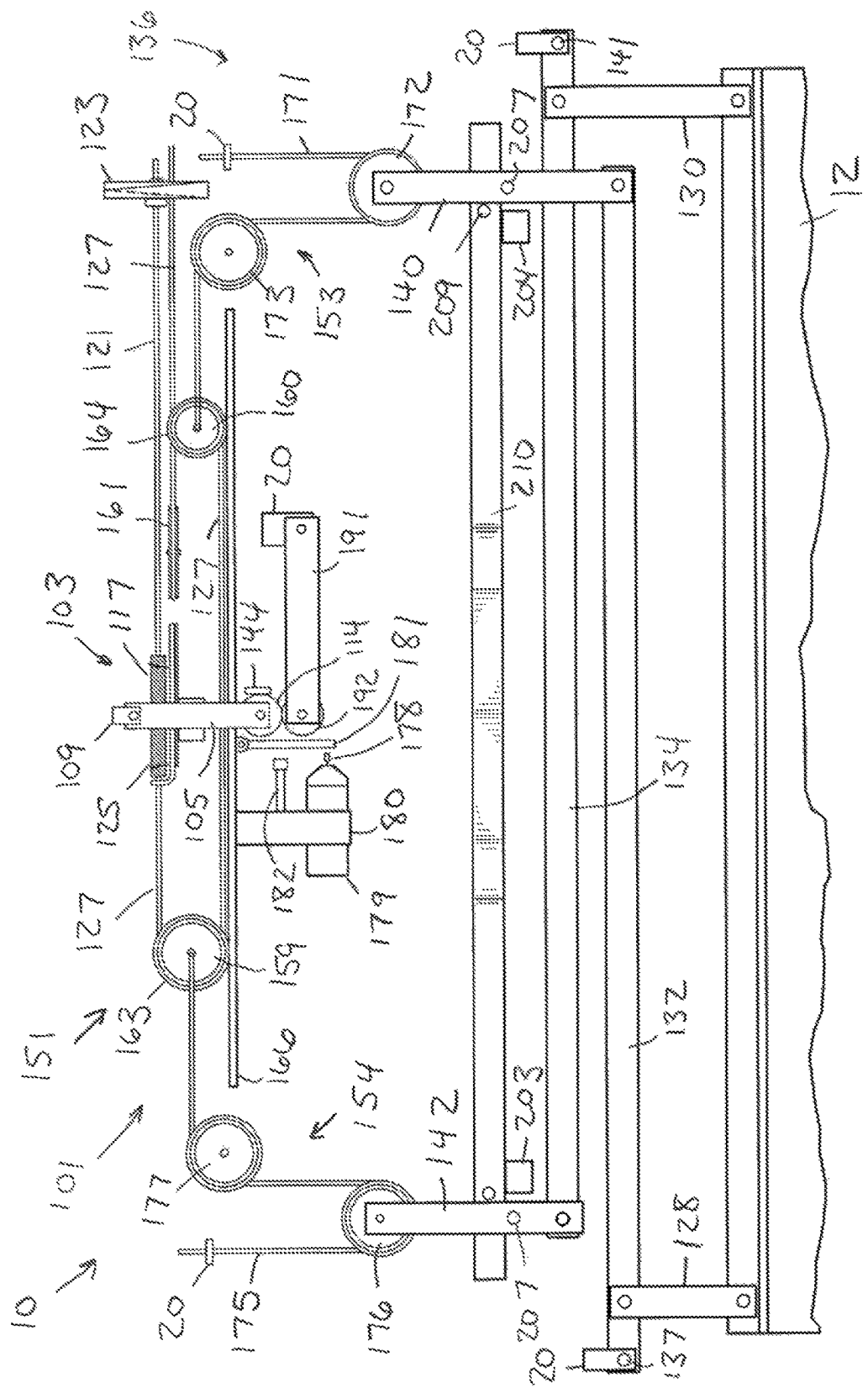
FIG. 11 is a schematic illustration of portions of an alternative livestock weighing and sorting device incorporating a cable and pulley system including a motion multiplying pulleys for actuating a marking device or other mechanisms associated with the livestock weighing and sorting device.
Figure 12:
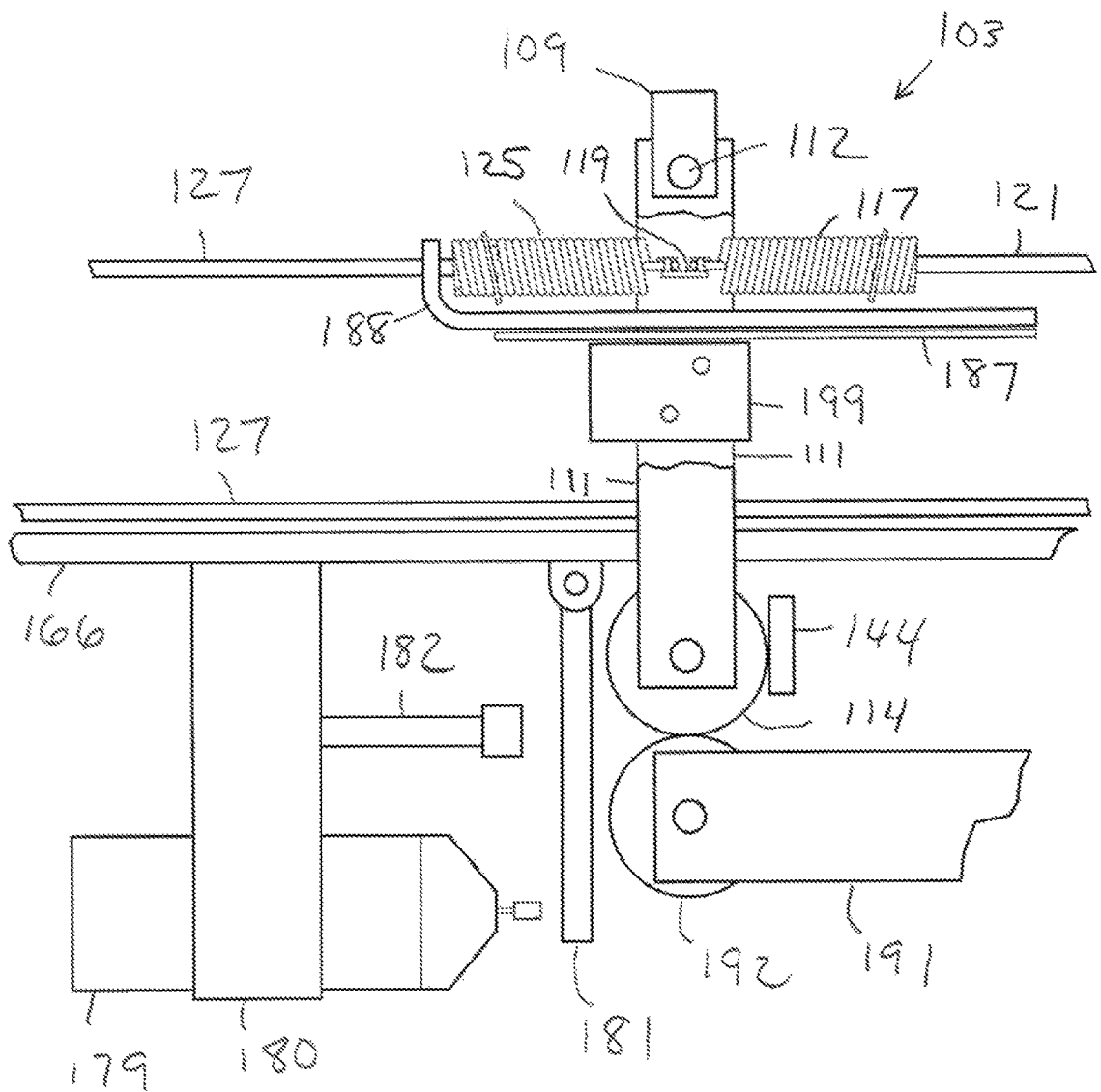
FIG. 12 is an enlarged and fragmentary schematic view of the livestock weighing and sorting device as shown in FIG. 11 showing details of the actuating mechanism with portions broken away to show details thereof.
Figure 13:
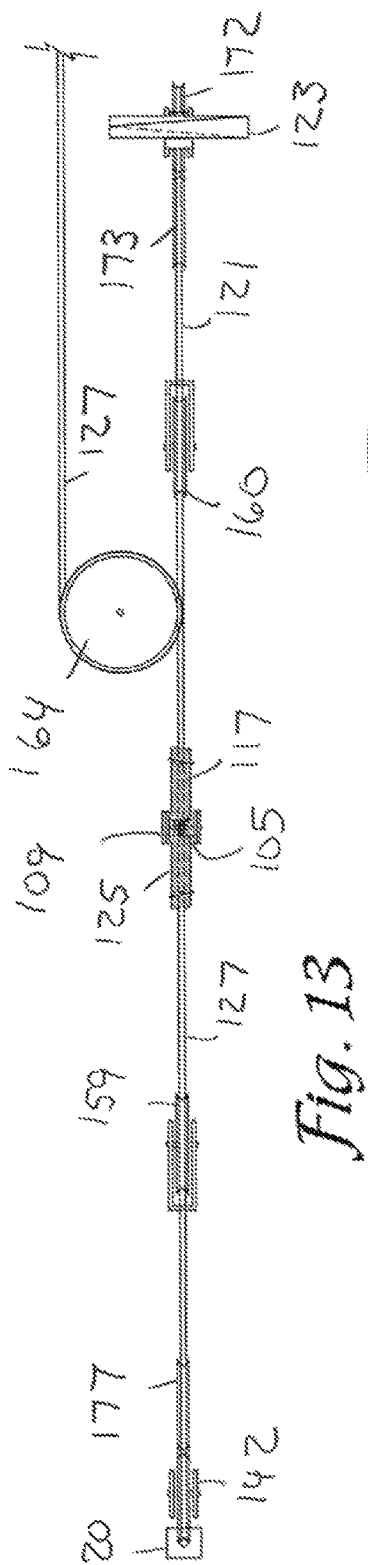
FIG. 13 is a top view of portions of the cable and pulley system shown in FIG. 11.
Figure 14:
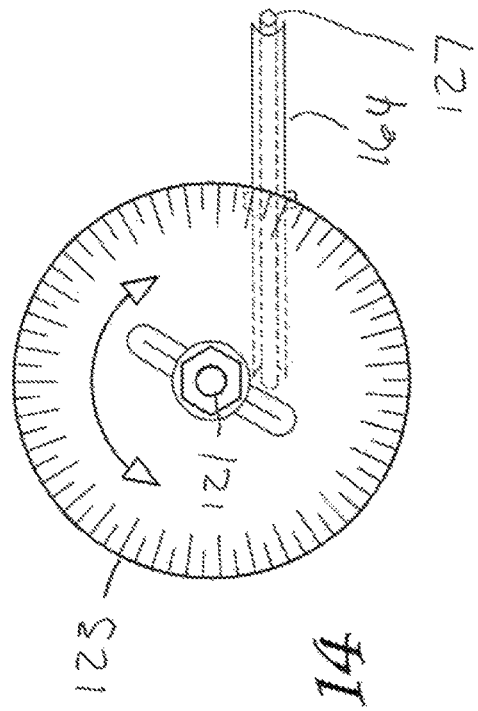
FIG. 14 is an end view of a tension setting dial for a trip setting spring of the cable and pulley system of the weighing device as shown in FIGS. 11 and 13.

FIG. 11 is a schematic view of an alternative embodiment of a cable actuating system 101 and a counterbalance mechanism 103 of the livestock weighing device 10 which can be used to induce movement of an actuator 105 as an animal moves across the chute or scale basket 12. More specifically, in the embodiment shown, the actuator 105 pivots to the left in FIG. 11, if the weight of an animal supported on the support platform in the chute 12 exceeds a selected weight. The actuator 105 can be used to dispense paint to mark the animal if the weight is exceeded or to activate other operations such as unlatching a gate which then opens to control the direction of movement of the animal after exiting the chute 12.

The actuator 105 generally comprises a pivot arm 107 depending from a clevis 109 connected to the frame 20. The pivot arm 107 comprises two spaced apart plates 111 connected at an upper end to the clevis 109 by a pivot pin extending therethrough. A roller 114 may be rotatably mounted between the plates 111 at a lower end thereof on a shaft supported between plates 111.

A trip setting spring 117, in the form of a tension type, coil spring, is connected at a first end to the pivot arm 107 on a spring mount 119. The spring mount 119 extends between the plates 111 just below the pivot pin 112. A tension setting cable or rod 121 is connected at a first end to the trip setting spring 117 near a second end thereof. A second end of the tension setting rod 121 is threaded and extends through a stop formed in the frame and through a tension adjustment dial 123 which is rotatably mounted around the threaded end of the tension setting rod 121 and held in place by a nut such as a wing nut. The tension adjustment dial 123 is formed from rear and forward halves having helical abutting surfaces. Rotation of the forward half in one direction relative to the rearward half increase the thickness of the dial 123 which draws the tension setting rod 121 further through the stop in the frame 20 which expands trip setting spring 117 thereby increasing the tension exerted by the spring 117 on the actuator arm 105. Rotation of the dial halves in the opposite direction forces the tension setting rod 121 back toward the trip setting spring 117 reducing the tension exerted on the actuator arm 105. A scale on the dial 123 is calibrated to indicate the weight necessary to overcome the tension on the trip setting spring 117.

An active spring 125, which is also a coil type, tension spring, is connected at a first end to the spring mount 119 and at a second end to a shuttle cable 127 of the cable actuating system 101. The active spring 125 extends away from the pivot arm 107 in a direction opposite from the trip setting spring 117. The active spring 125 is connected to first and second or lower and upper scale arms 132 and 134, through a cable and pulley system 136.

The scale arms 132 and 134 are connected to the chute 12 by first and second hangers 128 and 130 respectively. A first end of the scale arm 132 is connected to the frame 20 at a pivot connection 137 near a first end of the chute 12 and the second end of the first scale arm 132 is coupled to a first suspension link 140 which connects the second end of the lower support arm 132 to the cable and pulley system 136. The first hanger 128 is pivotally connected at its upper end to the first support arm 132 near the pivot connection 137, and between the pivot connection 137 and the second end of the first support arm 132 creating a long lever arm and large mechanical advantage in the first support arm 132.

The second or upper scale arm 134 is oppositely oriented; the upper scale arm 134 is coupled at a first end thereof to the frame 20 at a pivot connection 141 near the second end of the chute 12 and to a second suspension link 142 near the first end of the chute 12. The second hanger 130 couples to the upper scale arm 134 adjacent the pivot connection 141 of the of the second hanger arm 130 with the frame 20 and between the pivot connection 141 and the second end of the upper scale arm 134. A long lever arm and large mechanical advantage is thus formed in the upper scale arm 134 by the length of the upper scale arm 134 between the second hanger 130 and the coupling with the second suspension link 142.

The weight of an animal passing through the chute 12 is transferred to the active spring 125, through the hangers 128 and 130, scale arms 132 and 134, suspension links 140 and 142 and the cable and pulley system 136. Prior to an animal passing through the chute 12, the tension of the trip setting spring 117 pulls the pivot arm 107 towards the trips setting spring 117 until the roller 114 on the lower end of the pivot arm 107 abuts against a stop 144 on frame 20. When the weight of the animal is fully supported in the chute 12, if the weight of the animal exceeds a set weight or trip point, the tension exerted by the cable and pulley system 136 on the active spring 125 exceeds the tension holding the trip setting spring compressed 117 which causes the pivot arm 107 to pivot in the direction of the active spring 125.

The cable and pulley system 136 includes a carriage or shuttle assembly 151 and first and second motion multiplying assemblies 153 and 154. The shuttle assembly 151 includes the shuttle cable 127 connected to and extending away from an end of the active spring 125 opposite the spring mount 119 in combination with three pulleys, an active side pulley 159, a trip setting side pulley 160 and a redirecting or offsetting pulley 161, around which the cable 127 is strung. The active side pulley 159 and the trip setting side pulley 160 are each rotatably mounted within and coaxially with rollers, namely, active side roller 163 and trip setting side roller 164 respectively. The combination of the active side roller 163 and active side pulley 159 may be referred to as just the active side pulley 159. Similarly, the combination of the trip setting side roller 164 and trip setting side pulley 160 may be referred to as just the trip setting side pulley 160.

The rollers 163 and 164 are supported on a horizontal tack or shelf 166 which is connected to frame 20. The axles of the rollers 163 and 164 and the pulleys 159 and 160 extend horizontally and perpendicular to track 166. The track 166 extends between the plates 111 of the pivot arm 107. The redirecting pulley 161 is suspended from the frame 20 between the trip setting side pulley 160 and the pivot arm 107 and rotates about a vertically extending axis. The shuttle cable 127 is threaded from active spring 125 toward the first end of the chute 12, around active side pulley 159 and back toward the second end of the chute 12, through the plates 111 of pivot arm 107, around the trip setting side pulley 160 and back toward the first end of chute 12 and then around redirecting pulley 161 and back toward or past the second end of the chute 12 to a point (not shown) where it is connected to the frame 20 by means through which the tension on the shuttle cable 127 can be adjusted. The tension adjusting means for the shuttle cable 127 may be constructed similar to dial 123 or may simply be a wing nut connected to a threaded connector on the end of shuttle cable 127 acting on a portion of the frame 20 through which the cable 127 is threaded. The offsetting pulley 161 positions the leg of the cable 127 extending from pulley 161 to the second end of the chute 12 so that it is offset laterally from the tension setting rod 121 so as not to be obstructed by dial 123.

A first motion multiplying assembly 153 is connected between the first suspension link 140 and the trip setting side pulley 160. The first motion multiplying assembly 153 includes a first multiplier cable 171, first multiplier pulley 172 and first guide roller or pulley 173. The guide roller 173 is rotatable mounted to frame 20 on an axle extending perpendicular to track 166. The guide roller 173 is positioned between a second end of the track 166 and the second end of the chute 12. The multiplier pulley 172 is mounted to frame 20 on an axle extending perpendicular to track 166 and outward from the guide roller 173 toward the second end of the chute 12. A first end of first multiplier cable 171 is connected to the frame 20 above and on the outer side of the first multiplier pulley 172. The cable 171 is threaded down and around first multiplier pulley 172 approximately one hundred and eighty degrees and back up to and around the first guide roller 173 approximately ninety degrees to extend horizontally and inward toward the trip setting side pulley 160 to which the cable 171 is connected to an axle thereof by means such as a clevis not shown. The downward movement of first support link 140 due to downward movement of scale arm 132, will result in twice the longitudinal movement of the trip setting side pulley 160 by the first motion multiplying assembly 153.

The second motion multiplying assembly 154 is connected between the second suspension link 142 and the active side pulley 159. The second motion multiplying assembly 154 includes a second multiplier cable 175, second multiplier pulley 176 and second guide roller or pulley 177. The second guide roller 177 is rotatable mounted to frame 20 on an axle extending perpendicular to track 166. The second guide roller 177 is positioned between a first end of the track 166 and the first end of the chute 12. The multiplier pulley 176 is mounted to frame 20 on an axle extending perpendicular to track 166 and outward from the guide roller 177 toward the first end of the chute 12. A first end of second multiplier cable 175 is connected to the frame 20 above and on the outer side of the second multiplier pulley 176. The cable 175 is threaded down and around second multiplier pulley 176 approximately one hundred and eighty degrees and back up to and around the second guide roller 177 approximately ninety degrees to extend horizontally and inward toward the active side pulley 159 to which the cable 175 is connected to an axle thereof by means such as a clevis not shown. The downward movement of second support link 142 due to downward movement of second scale arm 134, will result in twice the longitudinal movement of the active side pulley 159 by the second motion multiplying assembly 154.

As the forces acting on the active spring 125 through the shuttle cable 127 increase, as the weight supported by the chute 12 increase, the active spring 125 expands until the force acting on the pivot arm 107 through the active spring 125 and the shuttle cable 127 exceeds the spring force of the trip setting spring 117. When the force acting on the pivot arm 107 exceeds the spring force of the trip setting spring 117, the pivot arm 107 pivots in the direction of the active spring 125 and toward the first end of the chute 12 which advances the roller 114 mounted on the lower end toward the first end of the chute 12 and into engagement with any item positioned in its path, such as a nozzle 178 of a can 179 of spray paint.

In the embodiment shown schematically in FIG. 11, the can 179 of paint is suspended from the track 166 by a hanger 180. A lever 181 is shown hingedly or pivotally suspended from the track 166 between the pivot arm 107 and the nozzle 178. When the pivot arm 107 is actuated and pivots toward the active spring 125, the roller 114 engages the lever 181 and pivots it into engagement with the nozzle 178. A stop 182 shown connected to the hanger 180, prevents the lever 181 from damaging the nozzle 178 by compressing it too far relative to the can 179.

In the embodiment shown, a second pivot arm 191 with a roller 192 rotatably mounted at a distal end thereof is pivotally connected to the frame 20 below the track 166. The second pivot arm 181 is mounted to the frame 20 so that when it is pivoted horizontally, the roller 182 of the second pivot arm 181 extends under and in contact with the roller 114 of the first pivot arm 107. A spring (not shown) acting on second pivot arm 181 normally draws the distal end of the pivot arm 181 upward towards the first pivot arm 107 and the track 166. When the first pivot arm 107 pivots away from the stop 144. The movement of the second pivot arm 181 can be used to actuate other mechanisms associated with the device 10.

The extension of the active spring 125 relative to the pivot arm 107 can be used to determine and display the weight of an animal supported in the chute 12. A calibrated, machine readable strip 187 with machine readable markings or features thereon, such as a magnetic strip, is mounted on a rigid support 188 which is connected to the shuttle cable 127 proximate the distal end of active spring 125. The rigid support 188 and machine readable strip 187 extend between the plates 111 of the pivot arm 107 with the machine readable strip 187 facing downward. The calibrated machine readable strip 187 and support 188 may be referred to as a ruler. An encoder 199 is mounted between the plates 111, below and facing the machine readable strip 187. As the weight supported in the chute 12 increases, and active spring 125 expands, the ruler slides toward the first side and relative to the pivot arm 107 and encoder 190. The encoder 190 generates a digital signal indicative of the weight of the animal supported in the chute based upon the length of expansion of the active spring 125 and the corresponding movement of the rigid support 188 and machine readable strip 187 relative to the encoder 190 on pivot arm 107.

When the pivot arm 107 trips in response to the force acting on the active spring 125 exceeding the spring force on the trip setting spring 117, the trip setting spring 117 only expands momentarily and until the roller 114 on pivot arm 107 engages and actuates the structure to be actuated, such as the nozzle 178 on the can 179 of spray paint. Thereafter, further pivoting of the pivot arm 107 to the first side of chute 12 is blocked and trip setting spring 117 does not expand further. Active spring 125 continues to expand which results in continued or further movement of the rigid support 188 and machine readable strip 187 relative to the encoder 199 to provide a digital readout corresponding to the weight of the animal. The digital readout from the encoder 199 can be used to display the weight of an animal weighed by the device 10 on a digital display (not shown). The weight may be calculated for animals both above and below a set point corresponding to the spring force exerted by the trip setting spring 117.

In FIG. 11, a tare bar 210 is shown supported on supports 203 and 204 which are connected to frame 20. The supports 203 and 204 extend outward from the frame 20 above the first and second scale arms 132 and 134 and between the first and second suspension links 140 and 142. The tare bare 201, a fragmentary top view of which is shown in FIG. 15, is used to prevent one end of the chute 12 from sagging to the ground when not in use.

The first and second suspension links 140 and 142 are preferably formed from spaced apart bars or plates extending on opposite sides of the scale arms 132 and 134 respectively to which they are attached. Stop pins 207 extend between the plates forming links 140 and 142 in horizontal alignment. The tare bar 201 is shaped to allow it to be inserted between the spaced apart plates forming both the first and second suspension links 140 and 142. Longitudinal restraint pins 209 project from the sides of the tare bar 201 just inside of the suspension links 140 and 142 to restrain longitudinal movement of the tare bar 201 relative to the links 140 and 142 and supports 203 and 204.

When the chute 12 is evenly balanced and supported by the cable and pulley system 136, the stop pins 207 extend just below the tare bar 201 supported on supports 203 and 204. The weight of the tare bar 201 acting downward on the stop pins 207 prevents either suspension link 140 or 142 and the associated first and second multiplier pulleys 172 and 176 from moving upward which prevents one end of the cable and pulley system 136 and of the chute 12 from lowering relative to the other end. If the tare bar 201 were not present, if first multiplier pulley 172 and suspension link 140 were allowed to rise when an animal is not present in the chute 12, the second multiplier pulley 176 and suspension link 142 would then lower, resulting in lowering of the upper support arm 134, the second hanger 130 and the second end of the chute 12. The tare bar 201 is particularly useful when adjusting the tension on the shuttle cable 127 to account for the tare weight of the chute 12 and the cable and pulley system 136, the scale arms 132 and 134 and the tare bar 210 itself. The chute 12 should be evenly balanced and suspended off of the ground to properly adjust for the tare weight. The weight of an animal entering the chute 12 will overcome the tare weight of the tare bar 201 acting on the stop pins 207 to permit normal functioning of the scale as described previously.

Figure 15:
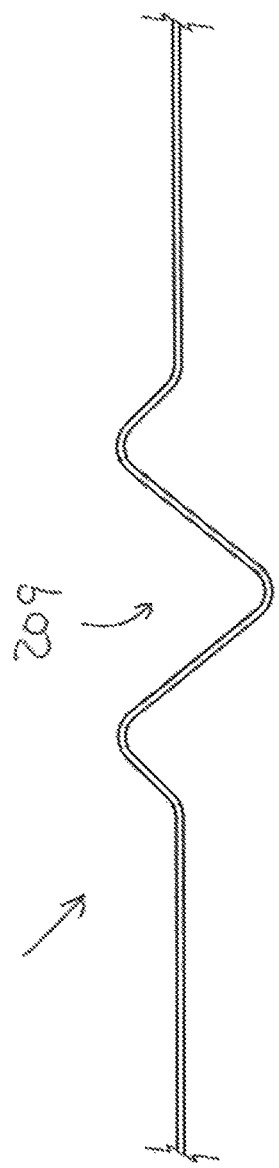
FIG. 15 is a fragmentary, top plan view of a tare bar used in association with setting a tare weight for the weighing device as shown in FIG. 11.

With reference to FIG. 15, a center portion of the tare bar 210 may be shaped to present a clearance 209 through or past which paint from the can 179 may be sprayed without obstruction.

Figure 16:
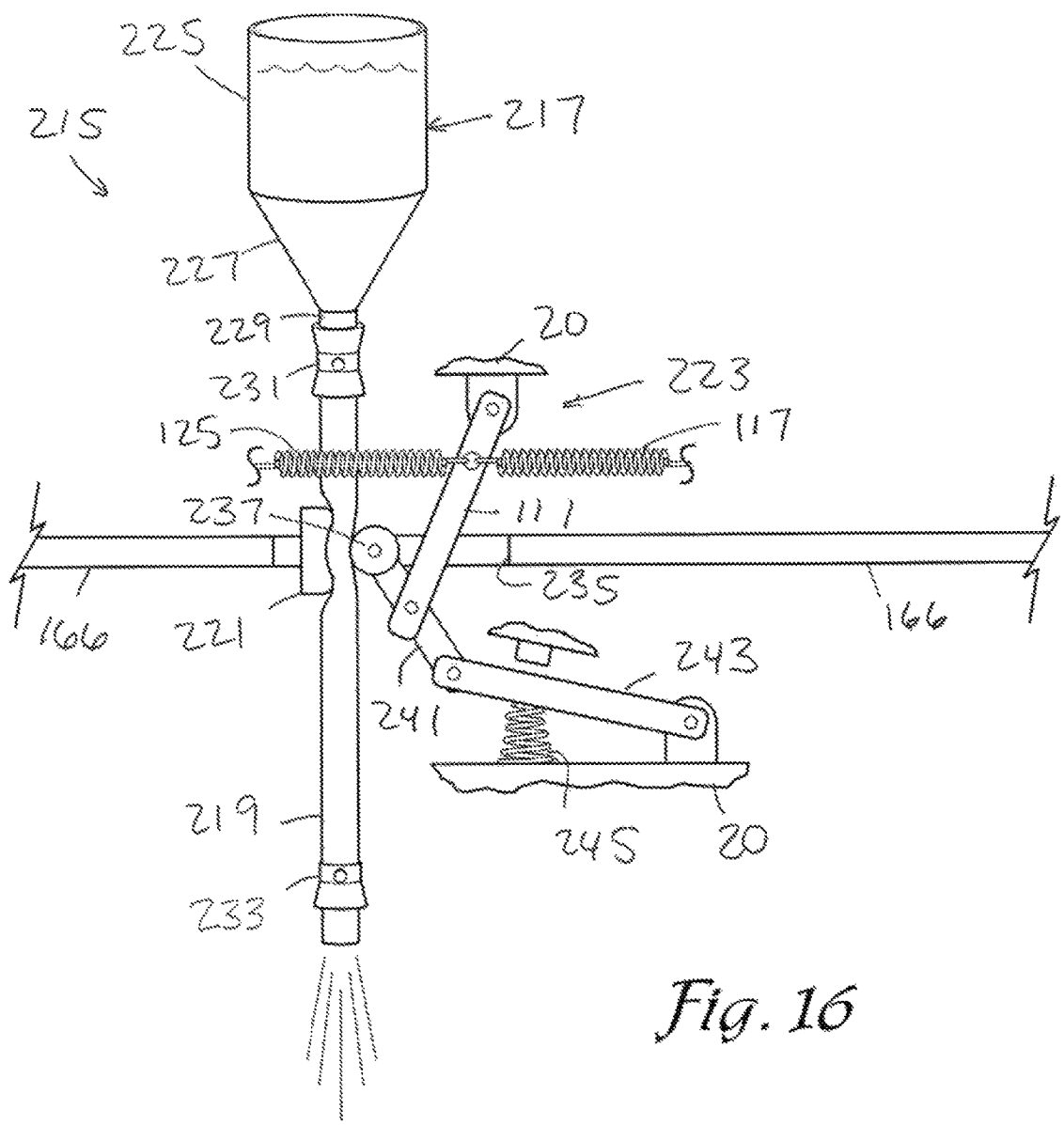
FIG. 16 is a schematic view of an alternative marking apparatus incorporated into the weighing device.

An embodiment of a paint applicator 215 that can be used in association with the weighing and sorting device as shown in FIG. 11 is shown in FIG. 16. The paint applicator 215 includes a supply container 217, an applicator tube 219, an anvil 221 and an actuator assembly 223. The supply container 217 shown includes an upper section 225 with a funnel section 227 and an outlet conduit 229 depending from the funnel section 227. A check valve 231 is connected in-line to the outlet conduit 229 and the applicator tube 219 is connected the check valve 231 on a side opposite the outlet conduit 229. The check valve 231 is oriented to allow a marking solution or agent, such as paint, to flow from the supply container 217 into the applicator tube 219 but not from the applicator tube 219 into the container 217. A pressure responsive valve 233 is connected to the applicator tube 219 near a lower or distal end thereof. The pressure responsive valve 233 may include a biasing element (not shown), normally compressing the end of the applicator tube 219 shut and wherein the outward pressure exerted on the biasing element due to the pressure exerted by the height of the column of paint in the applicator tube 219 is insufficient to open the valve 233.

The supply container 217 is connected to the frame 20 above the track 166 and generally centrally between opposite ends of the chute 12 and animal support platform or bottom panel 22. The applicator tube 219 hangs downward through a gap or opening 235 in the track 166 between the active side pulley 159 and the trip setting side pulley 160. Anvil 221 is mounted on the frame 20 or the track 166 in gap 235 and adjacent the applicator tube 219 on a side opposite the actuator assembly 223. Portions of actuator assembly 223 are constructed similar to actuator 105 in FIG. 11 except that it includes a roller 237 mounted on the end of a pivoting linkage assembly 239 which is pivotally mounted between plates 111 instead of the roller 114 mounted directly between the plates 111. The pivoting linkage assembly 239 is also pivotally connected to the frame 20 at an end opposite roller 237.

When the plates 111 of the actuator assembly 223 are drawn to a generally vertical alignment by the trip setting spring 117, a first link 241 of the pivoting linkage assembly 239 is pivoted into generally vertical alignment between the plates 111 such that the roller 237 extends between plates 111. A second link 243 is pivotally connected between the first link 241 and the frame 20. A compression spring 245 is shown connected between the frame 20 and the second link 243 and normally biases the pivoting linkage assembly 239 so that the roller is pivoted away from the applicator tube 219 and between plates 111.

When the force acting on the actuator assembly 223 through the active spring 125 causes the plates 111 to pivot toward the active spring 125 the roller 237 is pivoted toward the anvil 221 compressing the applicator tube 219 between the anvil 221 and the roller 237. The increased pressure exerted on the paint contained in the applicator tube 219 overcomes the biasing force of the pressure responsive valve 233 to dispense paint past the valve 233 and out of the applicator tube 219. The check valve 231 prevents additional paint from flowing into the tube 219 from the supply container 217 until back pressure on the check valve 231 is released upon pivoting of the roller 237 away from the anvil 221.

Many different arrangements of the various components depicted, as well as components not shown, are possible without departing from the scope of embodiments described herein. Embodiments of the technology have been described with the intent to be illustrative rather than restrictive. Alternative embodiments will become apparent to readers of this disclosure after and because of reading it. Alternative means of implementing the aforementioned can be completed without departing from the scope herein. Identification of structures as being configured to perform a particular function in this disclosure is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of this description.

Having thus described the invention, what is claimed as new and desired to be secured by Letters Patent is as follows:

1. A livestock weighing device for weighing an animal and actuating a secondary operation if the detected weight exceeds a target weight, the livestock weighing device comprising:
    a frame;
    a platform;
    first and second scale arms extending generally horizontally; the first scale arm pivotally connected to the frame at a first pivotal connection proximate a first end of the platform and connected to a first suspension link proximate a second end of the platform; the second scale arm pivotally connected to the frame at a second pivotal connection proximate a second end of the platform and connected to a second suspension link proximate a first end of the platform; the platform suspended from the first scale arm by a first hanger connected to the first scale arm between the first pivotal connection and the first suspension link and from the second scale arm by a second hanger connected to the second scale arm between the second pivotal connection and the second suspension link;
    a track connected to and extending generally horizontally relative to the frame above the first and second scale arms and extending generally longitudinally relative to the intended direction of travel of an animal across the platform;
    a shuttle supported on and longitudinally shiftable across the track;
    a first flexible linkage operably connected between the shuttle and the first suspension link, wherein the first suspension link may comprise a portion of said first flexible linkage;
    a second flexible linkage operably connected between the shuttle and the second suspension link, wherein the second suspension link may comprise a portion of said second flexible linkage;
    a first guide means connected to the device proximate a second end of the platform; the first guide means redirecting the first flexible linkage to extend horizontally and inward relative to the second end of the platform and toward the shuttle;
    a second guide means connected to the device proximate a first end of the platform; the second guide means redirecting the second flexible linkage to extend horizontally and inward relative to the first end of the platform and toward the shuttle;
    an actuator operably advanceable between first and second conditions through longitudinal movement of the shuttle; and
    a trip weight setting means applying a resistive force to prevent advancement of the actuator between the first and second conditions until a counteracting force corresponding to the weight of the animal supported on the platform transmitted through the first and second scale arms and the first and second flexible linkages and acting in opposition to the resistive force exceeds the resistive force and wherein when the counteracting force exceeds the resistive force the actuator advances between the first and second conditions to perform a secondary operation.

2. The livestock weighing device as in claim 1 wherein the secondary operation may be marking an animal on the platform and wherein the device further comprises:
    a container of a marking substance, the container supported on the device and having an outlet valve through which the marking substance may be released; and wherein advancement of the actuator from the first to the second condition causes the outlet valve to open to dispense a quantity of the marking substance.

3. The livestock weighing device as in claim 2 wherein the container of the marking substance is supported on the shuttle above the platform; when an animal partially advances onto the platform from the first side, the weight of the animal acting downward on the platform draws the first hanger and the first scale arm downward, drawing the horizontal section of the first flexible linkage and the shuttle connected thereto toward the second side of the platform, and thereafter, when the animal advances further onto the platform toward the second side so that the entire weight of the animal is supported on the platform, the weight of the animal acting downward on the platform further draws the second hanger and the second scale arm downward, drawing the horizontal section of the second flexible linkage and the shuttle connected thereto toward the first side of the platform; as the shuttle is advancing toward the first side of the platform, if the counteracting force due to the weight of the animal on the platform exceeds the resistive force, the actuator advances between the first and second conditions causing the outlet valve to open when the shuttle is located over and proximate the center of the support platform.

4. The livestock weighing device as in claim 1 wherein a ridge extends across the platform from side to side and centrally relative to the ends of the platform.

5. A livestock weighing device for weighing and marking an animal, the livestock weighing device comprising:
    a frame;
    a platform;
    first and second scale arms extending approximately horizontally; the first scale arm pivotally connected to the frame at a first pivotal connection proximate a first end of the platform and connected to a first flexible linkage proximate a second end of the platform; the second scale arm pivotally connected to the frame at a first pivotal connection proximate a second end of the platform and connected to a second flexible linkage proximate a first end of the platform; the platform suspended from the first scale arm by a first hanger connected to the first scale arm between the first pivotal connection and the first flexible linkage and from the second scale arm by a second hanger connected to the second scale arm between the second pivotal connection and the second flexible linkage;

a track connected to and extending generally horizontally relative to the frame above the first and second scale arms and extending generally longitudinally relative to the intended direction of travel of an animal across the platform;

a shuttle supported on and longitudinally shiftable across the track and having an actuator connected thereto and projecting upward;

the first flexible linkage operably connected between the first scale arm and the shuttle on a first side thereof;

the second flexible linkage operably connected between the second scale arm and the shuttle on a second side thereof;

a first pulley assembly connected to the device proximate a second end of the platform and around which said first flexible linkage is threaded;

the first pulley assembly redirecting the first flexible linkage to extend horizontally and inward relative to the second end of the platform and toward the shuttle;

a second pulley assembly connected to the device proximate a first end of the platform and around which said second flexible linkage is threaded; the second pulley assembly redirecting the second flexible linkage to extend horizontally and inward relative to the first end of the platform and toward the shuttle;

a balance arm pivotally connected to the frame between first and second ends, a weight support on which incremental weights may be selectively added is connected to the balance arm proximate the first end thereof, at least a portion of the first pulley assembly is suspended from the balance arm proximate the second end thereof, a trigger arm connected to the balance arm and extending therebelow, the trigger arm having a trigger member connected thereto, wherein, when the weight supported on the weight support exceeds the downward force acting on the second end of the balance arm through the first pulley assembly, the trigger member is pivoted out of a longitudinal path of travel of the actuator on the shuttle, and when the downward force acting on the second end of the balance arm through the first pulley assembly exceeds the weight supported on the weight support, the balance arm and the trigger arm pivot to pivot the trigger member into the longitudinal path of travel of the actuator on the shuttle and the trigger member engages the actuator as the shuttle is drawn by the second flexible linkage past the trigger member away from a first end and towards a second end of the platform.

6. The livestock weighing device as in claim 5 wherein the device further comprises:

a container of a marking substance, the container supported on the device and having an outlet valve through which the marking substance may be released; and wherein engagement of the actuator by the trigger member advances the trigger member into operable engagement with the outlet valve of the container causing the outlet valve to open and release a quantity of marking substance therethrough.

7. The livestock weighing device as in claim 5 wherein a ridge extends across the platform from side to side and centrally relative to the ends of the platform.

8. A livestock weighing device for weighing and marking an animal, the livestock weighing device comprising:

a frame;

a platform;

first and second scale arms extending approximately horizontally; the first scale arm is pivotally connected to the frame at a first pivotal connection proximate a first end of the platform and is connected to a first suspension link proximate a second end of the platform; the second scale arm is pivotally connected to the frame at a first pivotal connection proximate a second end of the platform and is connected to a second suspension link proximate a first end of the platform; the platform is suspended from the first scale arm by a first hanger connected to the first scale arm between the first pivotal connection and the first suspension link and from the second scale arm by a second hanger connected to the second scale arm between the second pivotal connection and the second suspension link;

a track connected to and extending generally horizontally relative to the frame above the first and second scale arms and extending generally longitudinally relative to the intended direction of travel of an animal across the platform;

a shuttle supported on and longitudinally shiftable across the track;

a first multiplier pulley connected to the first suspension link above the first scale arm;

a second multiplier pulley connected to the second suspension link above the second scale arm;

a first flexible linkage connected at a first end to the frame and extending downward and around the first multiplier pulley and then upward and around a first guide member redirecting the first flexible linkage to extend horizontally and inward toward the first side of the shuttle to which it is connected;

a second flexible linkage connected at a first end to the frame and extending downward and around the second multiplier pulley and then upward and around a second guide member redirecting the second flexible linkage to extend horizontally and inward toward the second side of the shuttle to which it is connected;

an actuator operably advanceable between first and second conditions through longitudinal movement of the shuttle; and a trip weight setting means applying a resistive force to prevent actuation of the actuator between the first and second conditions until a counteracting force corresponding to the weight of the animal supported on the platform transmitted through the first and second scale arms and the first and second flexible linkages and acting in opposition to the resistive force exceeds the resistive force and wherein when the counteracting force exceeds the resistive force the actuator advances between the first and second conditions to perform a secondary operation.

9. The livestock weighing device as in claim 8 wherein said actuator comprises an actuator arm pivotally connected to the frame and the trip weight setting means comprises a trip setting tension spring connected at one end to the actuator arm and to a tension member extending away from the actuator arm and connected to the frame, an active tension spring is connected to the actuator arm and extends on a side opposite the trip setting tension spring, the shuttle includes a link connected to the active tension spring, the trip setting tension spring and the tension member resisting pivoting of the actuator arm away from trip setting spring until the counteractive force acting on the trip setting tension spring, through the link between the shuttle and the active spring and transmitted from the platform through the first and second scale arms and the first and second flexible linkages to the shuttle, exceeds the resistive force exerted on the actuator arm by the trip setting tension spring.

10. The livestock weighing device as in claim 9 wherein the length of the tension member extending between the frame and the trip setting spring is adjustable to adjust the tension exerted by the trip setting tension spring on the actuator arm.

11. The livestock weighing device as in claim 9 wherein a machine readable strip having incremental indicia incorporated therein is connected to the link between the shuttle and the active spring and extends transverse to and independent of the actuator arm and an encoder is mounted on the actuator arm to detect changes in the positions of the incremental indicia on the machine readable strip relative to the encoder and the actuator arm for use in calculating a weight supported on the platform based upon the extent of extension of the active spring relative to the actuator arm.

12. The livestock weighing device as in claim 8 wherein the secondary operation comprises marking an animal on the platform and wherein the device further comprises:
    a container of a marking substance, the container supported on the device and having an outlet valve through which the marking substance may be released; and
    wherein advancement of the actuator from the first to the second condition causes the outlet valve to open to dispense a quantity of the marking substance.

13. The livestock weighing device as in claim 8 wherein a ridge extends across the platform from side to side and centrally relative to the ends of the platform.

14. In a weighing device for weighing four footed animals and having a platform suspended from a frame through a weighing mechanism, wherein an animal to be weighed advances onto the platform from a first end and advances off of the platform at a second end opposite the first end and wherein the relative weight of the animal is determined when the weight of the animal is fully supported on the platform, the improvement comprises a ridge extending across the upper surface of the platform centrally between the first and second ends of the platform and transverse to the direction of travel of an animal across the platform.

15. The weighing device as in claim 14 wherein the height of the ridge and the spacing between each of the first and second ends of the platform and the ridge is selected such that an animal of a selected species advancing onto the platform positions both of its front feet and at least one of its rear feet on the platform in front of the ridge before it places either of its front feet over the ridge and onto the platform on the opposite side of the ridge.

16. The weighing device as in claim 15 wherein the platform is included in a chute suspended from the weighing mechanism and the ridge extends from side to side of the chute.

* * * * *